Aug. 28, 1956 — R. GUYOT — 2,760,573

TAPE CUTTER

Filed May 24, 1954

INVENTOR:
Reinhard Guyot

United States Patent Office 2,760,573
Patented Aug. 28, 1956

2,760,573

TAPE CUTTER

Reinhard Guyot, Burbank, Calif.

Application May 24, 1954, Serial No. 431,697

6 Claims. (Cl. 164—84.5)

This invention relates to devices used for cutting tapes, and more particularly to devices used for cutting adhesive tapes.

In general, the broad object of this invention is to provide a simple and practical cutter which is capable of cutting adhesive tapes which are made of tough materials.

An additional object of this invention is to provide a cutter which will fit, without any adjustment, any roll of adhesive tape of the same width, regardless of its size of diameter, make or material on which it is to be used.

A further object of this invention is to provide a cutter which makes use of the adhesive quality of the tape alone for attaching itself to this tape.

Another object of this invention is to provide a cutter which uses the adhesive quality of the tape alone for the required resistance during the cutting process.

Another object of this invention is to provide a simple means for detaching the end of the adhesive tape from its own roll of material, when the tape is being used.

The features of design and structure by means of which these objects are accomplished, and other objects which will become apparent, may be best described in connection with the accompanying drawing in which.

Figure 4:
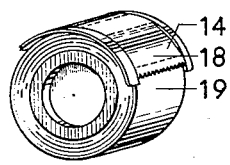

Figs. 4–9 inclusive illustrate the same tape cutter in operation, in which:

Fig. 4 is the tape cutter attached to the tape in a closed position.

Figure 5:
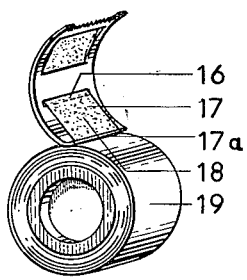

Fig. 5 is the tape cutter attached to the tape in an open position.

Figure 6:
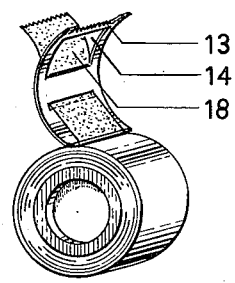

Fig. 6 is the tape cutter with the end of the tape detached.

Figure 7:
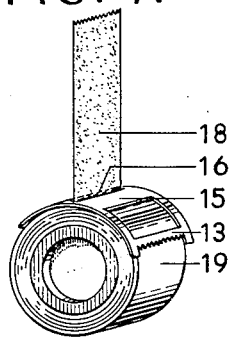

Fig. 7 is the tape cutter with the tape detached and pulled out to a desired length.

Figure 8:
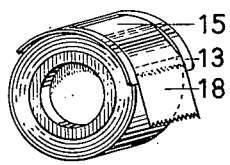

Fig. 8 is the tape cutter with the pulled out tape brought over the attaching plate section and cutting blade.

Figure 9:
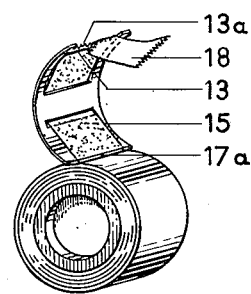

Fig. 9 is the tape cutter in an open position with the attached tape being cut.

Figure 1:
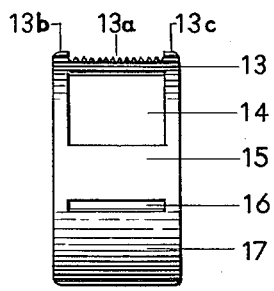
Fig. 1 is a front view of the tape cutter.
Figure 2:
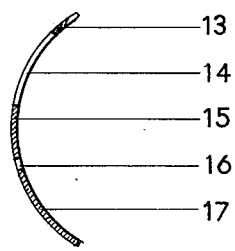
Fig. 2 is a mid-section of the tape cutter.
Figure 10:
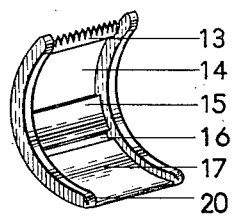

Fig. 10 is an isometric view of the same tape cutter as shown in Figs. 1 and 2 in a somewhat modified form.

This tape cutter is meant to be used for cutting adhesive tapes as well as detaching their ends from their own roll of material.

It has the advantage that it can be used equally well on a great variety of tapes regardless of their material, such as: paper, cellophane, rubber, linen etc., as used in drafting tapes, masking tapes, cellophane tapes, electric insulating tapes, friction tapes, adhesive plaster etc.

Another advantage is that it is so designed that it can be used equally well on any tape of the same width, regardless of its make or diameter of the roll thereof.

The tape cutter as shown in Figs. 1 to 9 inclusive comprises a single plate of rectangular cross section and preferable segmental or arcuate in the direction of its length, the plate being formed with an unobstructed longitudinally convex outer face and an unobstructed longitudinally concave inner face which latter is designed to be presented toward the perimeter of a roll of tape to which the cutter is to be applied. The radius of the concave inner face of the plate may correspond to or may be more or less than that of a full roll of tape.

The forward end of the plate is formed with a transversely extending cutting blade 13 preferably with a sharp serrated cutting edge 13a adapted to pierce the tape and hold it in place on the blade during the cutting operation.

Figure 3:
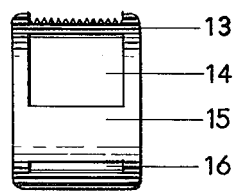
Fig. 3 is a front view of the same invention in a somewhat simpler form.

The cutting blade is further provided with two rounded protrusions 13b and 13c, placed at each side of the cutting edge, which will direct the tape to the correct cutting position and protect the user against injuries. The forward end portion of the plate is formed with an attaching and detaching aperture 14 arranged adjacent the blade 13, the rear edge of which blade forms the forward margin of the aperture 14. Formed intermediate the ends of the plate and leading from and forming the rear margin of the aperture 14 is an attaching plate section 15 which extends longitudinally and transversely of the tape cutter, which section terminates at and forms the forward margin of a narrow elongated transversely extending rectangular feeding slot 16, with which the plate is provided. The rearward margin of the slot 16 is formed by a spacer plate section 17 of suitable length constituting the rear end portion of the tape cutter, it being either elongated as shown in Figs. 1–2 or foreshortened as shown in Fig. 3. The spacer plate section 17 terminates in a blunt transversely straight rocker heel 17a which is designed to be positioned to seat on the perimeter of a tape roll and affords a fulcrum on which the tape cutter may be swung outwardly to effect stripping of a length of tape from the roll as will presently be described.

The purpose of the different plate sections and apertures of the tape cutter and their function are best illustrated in Figs. 4–9 inclusive.

As shown in Fig. 7, a length of tape 18 is inserted from its roll of material 19 from below the tape cutter through feeding slot 16 with its adhesive side presented towards the attaching plate section 15 and cutting blade 13 and pulled out to any desired length. Tape 18 is then moved down, Fig. 8, over the attaching plate section 15, aperture 14 and cutting blade 13 in order to span the aperture 14 and form a firm adhesive contact with section 15 and blade 13. After this, the tape cutter, Fig. 9., is swung upward on its rocker heel 17a and tape 18 pulled down over cutting edge 13a of the cutting blade 13. The adhesive quality of the tape attaches the tape firmly enough to the attaching plate section 15 and the cutting blade 13 and prevents it from slipping when the tape cutter is being swung upwardly and during the cutting process. Slipping sideways on the cutting blade is prevented by the sharp serrated cutting edge of the cutting blade.

After the cut is completed, the tape cutter, Fig. 4, is moved down and firmly attached and locked to the roll of material 19 by slightly pressing tape 18 through the attaching aperture 14 against its own roll of material 19.

If a new cut is desired, the tape cutter, Fig. 5., is rocked upwardly on its heel 17a and, Fig. 6, tape 18 detached from cutting blade 13 by pushing a finger through the detaching aperture 14 from the underside of the plate.

Now the process is repeated as illustrated in Figs. 7–9 inclusive, and described before.

In cases in which small pieces of tape of equal lengths are to be cut off from tapes with considerable adhesive quality, such as drafting tapes, it is desirable, however not essential for this invention, to provide the tape cutter, Figs. 1 and 2, with a spacer plate section 17 formed of a length corresponding to the length of the desired cut.

When the tape cutter, Fig. 5, is turned up around its heel 17a which is parallel to and furthest removed from the feeding slot 16, the spacer plate section detaches the desired length of tape 18 from its roll of material 19. The tape cutter, Fig. 6, is then detached from the tape and, Fig. 7, moved down not further than to the detached position, which can easily be felt. The process is then continued as described before and illustrated in Figs. 8 and 9.

It should be understood that this tape cutter may be made of a great variety of materials, such as ferrous and non-ferrous metals, plastics or others. A thin gauge of stainless steel, chrome plated metal, or brass are especially suitable as metals, and any hard grade of an acrylic or cellulose acetate plastic are especially suitable as plastics.

If made of metal, the tape cutter can be manufactured by stamping out of a thin sheet, and if made of plastic, it can be manufactured in an injection molding process.

It should also be understood that the outer appearance of the tape cutter, if made of a plastic, Fig. 10, may slightly differ from a tape cutter which is stamped out of a metal, Fig. 1, although it will incorporate the same essential parts as described in this invention. A reinforcing web 20 Fig. 10, might be provided along each of the side margins of the plate to add to the appearance and stability of the device.

Having thus described my invention, I claim:

1. A tape cutter for attachment to a roll of adhesive tape comprising an elongated longitudinally curved plate formed with smooth unobstructed inner and outer faces, a roll engaging rocker heel constituting the rear end of the plate, a tape cutting blade comprising the front end of the plate, said plate being formed with a tape attaching and detaching aperture arranged adjacent said blade and also being formed with a tape receiving slot arranged between said aperture and said heel and defining with said aperture an intermediate tape-engaging section extending between said slot and aperture.

2. The structure called for in claim 1 wherein the rear end portion of said plate extending between said slot and heel is elongated and constitutes a spacer section for measuring the length of the tape to be cut.

3. A tape cutter for attachment to the perimeter of a roll of adhesive tape comprising a plate terminating at one end in a transverse tape severing blade and terminating at its other end in a transverse rocker heel, said plate being formed with a tape receiving slot paralleling said heel through which a strip of tape can be extended from the under side of said plate to overlie the outer face of the outer end portion of said plate with the adhesive side of the tape presented thereto, and said plate being formed between said slot and blade with an aperture through which a portion of the tape overlying the outer face of the plate may be pressed into adhesive engagement with the perimeter of the roll and also through which the tape can be pressed outwardly from the under side of said plate to detach it from the plate on rocking said plate outwardly on said heel.

4. A tape cutter comprising a plate having unobstructed upper and lower faces and a forward end terminating in a blade, said plate being formed with a slot through which a length of tape can be passed from the lower to the upper side of said plate and extended forwardly over said blade and adhered thereto, said plate being formed with an aperture between said blade and slot arranged to be spanned by the tape whereby the portion of the tape spanning said aperture may be pressed from its underside and freed from said plate or pressed from its upper side into contact with the perimeter of a roll of tape extending therebeneath.

5. A tape cutter for attachment to the perimeter of a roll of adhesive tape comprising a longitudinally curved plate having unobstructed upper and lower faces and terminating at one end in a spacer plate having a transverse rocker heel forming one end of the plate, said plate being formed at its other end with a transverse tape severing edge, said plate being formed with an elongated aperture leading from adjacent said blade and having a narrow transverse tape receiving slot between said aperture and said spacer plate and defining between said slot and aperture a tape attaching plate section.

6. A tape cutter attachment for a roll of adhesive tape comprising an elongated plate for seating on the perimeter of a tape roll, said plate having a transverse slot through which the free end portion of the tape is extended from the underside of the plate, said plate having an intermediate plate portion at the inner side of said slot to the outer face of which the free end portion of the tape can be adhered, and said plate having an end portion at the outer side of said slot terminating in a rocker heel engageable with the perimeter of the tape reel and forming a fulcrum on which said plate may be swung outward to strip from the reel the length of tape extending between said slot and heel, and a cutter blade on the forward end of said plate.

References Cited in the file of this patent
UNITED STATES PATENTS

| | | |
|---|---|---|
| 2,309,093 | Borden | Jan. 26, 1943 |
| 2,528,958 | Johnson | Nov. 7, 1950 |
| 2,578,519 | Double | Dec. 11, 1951 |